United States Patent [19]

Locke et al.

[11] Patent Number: 5,236,728
[45] Date of Patent: Aug. 17, 1993

[54] PROCESS FOR PACKAGING FOOD HAVING A BAG PUNCTURING SURFACE

[75] Inventors: Ralph J. Locke, West Bloomfield, Mich.; David C. Netherton, Barrington, Ill.

[73] Assignee: Plan B, Inc., Wauwatosa, Wis.

[21] Appl. No.: 817,297

[22] Filed: Jan. 6, 1992

Related U.S. Application Data

[60] Division of Ser. No. 323,960, Mar. 14, 1989, Pat. No. 5,079,269, which is a continuation-in-part of Ser. No. 167,404, Mar. 14, 1988, Pat. No. 4,897,276.

[51] Int. Cl.$^5$ .......................... B65B 25/00; B65B 31/02
[52] U.S. Cl. .................................... 426/307; 426/410; 426/412; 426/413; 426/392; 426/124; 426/129; 206/521; 53/472
[58] Field of Search ............... 426/129, 124, 412, 307, 426/392, 410, 413; 53/434, 442, 441, 472; 206/523, 524, 497; 383/119; 156/78, 334; 264/50

[56] References Cited

U.S. PATENT DOCUMENTS

| | | |
|---|---|---|
| 2,556,278 | 6/1951 | Irvine . |
| 2,780,350 | 2/1957 | Simon et al. ........................ 206/46 |
| 2,961,322 | 11/1960 | Winterberg . |
| 3,251,911 | 4/1963 | Hansen ................................ 521/143 |
| 3,367,998 | 2/1968 | Osterrieth et al. ................. 525/210 |
| 3,394,797 | 7/1968 | Flannigan ........................... 206/46 |
| 3,415,364 | 12/1968 | Schneider ........................... 206/46 |
| 3,446,881 | 5/1969 | Poole .................................. 264/45 |
| 3,468,978 | 9/1969 | Battersby ........................... 525/210 |
| 3,864,181 | 2/1975 | Wolinski et al. .................. 521/140 |
| 3,912,665 | 10/1975 | Spitzer et al. ..................... 260/2.5 |
| 3,983,258 | 9/1976 | Weaver .............................. 426/307 |
| 4,059,466 | 11/1977 | Scholl et al. ...................... 156/78 |
| 4,059,714 | 11/1977 | Scholl et al. ...................... 428/310 |
| 4,094,715 | 6/1978 | Henderson et al. ............... 156/78 |

(List continued on next page.)

OTHER PUBLICATIONS

Encyclopedia of Polymer Science and Technology, vol. 9, 1968, pp. 181-193 and 15-16.
Wiley, Encyclopedia of Packaging Technology, 1968.
Packaging Encyclopedia and Yearbook, 1985, pp. 46-48.
Adhesives and Coating Manual, 1983, National Distillers and Chemical Corporation.
Elvax Resins Material Safety Data Sheet—Revised Jul. 1986.
Wingtack Tech. Facts Book, Revised Aug. 1971, Goodyear Chemicals.
Nordson Flomelt Systems, 1984, Nordson Corporation.
Epolene Waxes Low Molecular Weight Polyolefin Resins for Industrial Uses.
Foral 85 Synthetic Resin Product Data Sheet No. 7115-11, Hercules Inc., Revised Mar. 1982.
Foral 85 Synthetic Resin Material Safety Data Sheet, revised Sep. 12, 1986, Hercules Inc.

*Primary Examiner*—Steven Weinstein
*Attorney, Agent, or Firm*—Basile and Hanlon

[57] ABSTRACT

A process for packaging a product, particularly one with sharp protrusions, a composition for cushioning the sharp protrusions during packaging and a foamed material prepared therefore, the process including the steps of applying a foamed composition to the product to be packaged; and encasing the product in an outer package. The foamed material can be applied in liquid or semi-liquid form at a point-of-contact temperature less than about 130° F. and solidifies substantially on contact. The foamed material is, preferably, applied selectively to cover the sharp protrusions and contains a chemical substrate containing a polymer having the general formula, a resin and a stabilizer. A suitable gas is encapsulated therein. The process, composition and foamed material have particular utility in the meat-packing industry.

10 Claims, No Drawings

U.S. PATENT DOCUMENTS

| | | | |
|---|---|---|---|
| 4,101,711 | 7/1978 | Stillman | 428/474 |
| 4,136,141 | 1/1979 | Bauer et al. | 264/45.2 |
| 4,136,203 | 1/1979 | Murphy et al. | 426/124 |
| 4,136,205 | 1/1979 | Quattlebaum | 426/412 |
| 4,140,733 | 2/1979 | Meyer, Jr. | 525/210 |
| 4,146,521 | 3/1979 | Godfrey | 260/27 |
| 4,202,279 | 5/1980 | Rand | 109/34 |
| 4,212,910 | 7/1980 | Taylor et al. | 428/35 |
| 4,243,768 | 1/1981 | Simpson | 525/127 |
| 4,259,402 | 3/1981 | Cobbs, Jr. et al. | 428/310 |
| 4,446,254 | 5/1984 | Nakae et al. | 521/140 |
| 4,495,011 | 1/1985 | Scharfenberg et al. | 156/78 |
| 4,532,273 | 7/1985 | Kadowaki et al. | 523/402 |
| 4,532,281 | 7/1985 | Lee, Jr. et al. | 524/141 |
| 4,534,984 | 8/1985 | Kuehne | 426/412 |
| 4,561,918 | 12/1985 | Scharfenberg et al. | 156/78 |
| 4,588,470 | 5/1986 | Abegglen | 156/578 |
| 4,645,783 | 2/1987 | Kinoshita | 523/221 |
| 4,677,133 | 6/1987 | Leicht | 521/51 |
| 4,693,772 | 9/1987 | Douglas | 156/79 |
| 4,764,535 | 8/1988 | Leicht | 521/51 |
| 4,784,736 | 11/1988 | Lonsdale et al. | 204/157.15 |
| 4,791,142 | 12/1988 | Pleuse et al. | 521/50 | ered during insertion in the outer wrap, large amounts

PROCESS FOR PACKAGING FOOD HAVING A BAG PUNCTURING SURFACE

RELATED APPLICATIONS

This application is a divisional application of U.S. Ser. No. 7/323,960 filed on Mar. 14, 1989, now U.S. Pat. No. 5,079,269, which itself is a continuation-in-part of U.S. Ser. No. 07/167,404 filed Mar. 14, 1988 which has issued as U.S. Pat. No. 4,897,276.

BACKGROUND OF THE INVENTION

1. Field of the Invention

This invention relates to packaging processes; particularly those pertaining to packing of items having sharp protrusions and those pertaining to packing of edible products such as subprimal cuts of meat. Additionally, this invention relates to foamed polymeric materials suitable for use in such processes and compounds useful in the production of such foamed materials.

2. Description of the Relevant Art

In a variety of areas it is necessary to package products in such a manner which cushions sharp protrusions or particularly fragile portions. This is particularly necessary in food industries such as meat packing where products are wrapped in air-tight polymeric films.

When animal carcasses are prepared for shipping, they are often subdivided into portions and individually wrapped in an outer wrapper for preservation and protection during shipping and handling. The preferred outer wrap is an air-tight polymeric material in which the cut of meat may be vacuum packed and sealed. The size of the cuts of meat vary from smaller consumer-sized portions to very large "primal cuts" weighing many pounds.

Most meat portions are irregularly shaped and contain bones which protrude at one or more places on the cut. The protrusions which can be relatively sharp, tear and pierce the outer polymeric wrap in which the meat is encased. During storage and shipment from packing plant to warehouse, retailer or user, the cut is handled several times; further increasing the chances of puncture or tearing of the outer wrap. Puncture is particularly possible at the points of contact between the bag and any protruding bone. Vacuum packaging, which increases storage life also increases the risk of the outer wrap tearing. In vacuum packaging, the wrap is forced to conform to the contours of the meat during the evacuation process. This can cause stretching and strain over the protruding areas Various approaches have been tried to overcome the problems associated with torn or leaking outer wrappers. For example, the outer wrapper material may be strengthened to resist puncture. This would entail modification to the content or thickness uniformly throughout the wrapper material and would be expensive and unnecessary in view of the fact that the areas likely to be punctured are relatively limited.

Specialized containers have been proposed such as the one disclosed in U.S. Pat. No. 4,136,205 to Quattlebaum. Such containers or bags are generally reinforced with suitable cloth or strengthening material at points in the bag which roughly correspond to the protrusions. These containers are relatively expensive and require accurate placement of the meat cut within them if they are to function satisfactorily. Many configurations of these types of containers in many sizes may be necessary to package different cuts of meat as the various cuts have different contours and protrusions. Additionally, the carcasses of a particular type of animal may vary greatly in size and weight, necessitating even more variations in container size and shape.

Currently, the common practice in the meat packing industry is to swath the cut of meat in a large piece of a wax-impregnated, non-absorptive fabric prior to insertion in the outer wrapper. The fabric is interposed between the wrapper and the meat at puncture prone areas such as bone ends. Examples of such material are found in U.S. Pat. Nos. 2,891,870 and 3,653,927. In order to insure that the protrusions are adequately covered during insertion in the outer wrap, large amounts of the fabric must be used, covering major portions of the meat cut. This process is laborious time-consuming, expensive and generates a great deal of waste material and labor when the wrap is removed.

Because of these drawbacks, other methods of cushioning sharp protrusions have been proposed. Attempts have been made to cushion meat cuts in a variety of preformed foam materials positioned between the meat and wrapper. As indicated in U.S. Pat. No. 4,136,203 to Murphy, generally these attempts have not been satisfactory due to discoloration of meat in contact with the foam as a result of residual oxygen present in the foam. In order to overcome this problem, the Murphy reference proposes the use of an oxygen impervious wrapper film between the meat and foam. Even so, the mass and volume of the foam and wrapper employed in Murphy created transportation problems; adding weight and volume to each carcass and increasing transport costs. It is readily apparent that this solution does not promote packing efficiency or economy.

Direct application of liquified, contact-hardening cushioning materials, either foamed or non-foamed, to the meat has met with several drawbacks. Heretofore, all such materials available had to be applied at a temperature so high as to cause scalding and discoloration of the meat at the point of contact. In addition, many known cushioning materials were inappropriate for use with edible products. Others did not set rapidly enough to provide suitable coverage and protection.

Thus, it is desirable to provide a process for packaging products, particularly edible products such as meat, which reduces the chance of package rupture. It is desirable that this process employ a polymeric material which can be easily and selectively applied to protrusions without causing discoloration or blemishing of the meat. It is also desirable to provide a process in which a foamed material can be produced at the use site and dispatched at low temperatures. Finally, it is desirable to produce a foamed polymeric material which can be employed in a variety of packaging and other applications.

SUMMARY OF THE INVENTION

The present invention involves a process for packaging a product; particularly a product having sharp protrusions in which a foamed material is applied selectively to the product and the product is enclosed in an outer wrapping. The foamed material contains a polymer material having a molecular weight between about 1,800 and molecular weight units (Mw), about 25,000 molecular weight units (Mw), selected from the group consisting of polyethylene, ethylene vinyl acetate an mixtures thereof.

Also included in the foamed material is a suitable aliphatic hydrocarbon selected from the group consisting of polyterpenes, hydrogenated glycerol esters, and mixtures thereof. Also present in the foamed material is a suitable anti-oxidant stabilizer. The foamed material is produced by admixture of the above-listed components in a liquid or semi-liquid state with a suitable gaseous blowing agent. The material can be selectively applied to sharp protrusions on a product such as a cut of meat at a point-of-contact temperature between about 80° F. and about 130° F.

DESCRIPTION OF THE PREFERRED EMBODIMENTS

This invention is predicated on the unexpected discovery that newly formulated foamed materials can be successfully applied at low temperatures on edible products such as cuts of meat without adversely affecting the quality of the product. Selective application of these foamed materials on sharp protrusions provides a protective cushion against rupture or tearing of outer wrapping surrounding the cut of the meat during shipping and storage.

Specifically, this invention encompasses a process for packing products, particularly those having sharp protrusions, as well as a foamed material that can be used therein. Other uses and applications of this invention will become apparent to one skilled in the art upon reading this disclosure.

In the particular process of the present invention, fresh primal, subprimal or consumer-ready cuts of beef, pork, lamb or veal, as well as poultry and fish, having exposed bone surfaces with sharp jagged edges which would normally puncture a bag or similar package can be safely packaged. A foamed material is applied selectively to bag puncturing protrusions in the meat cut by a conventional means permit adherence between the foamed material and the surface of the cut of meat. The meat can, then, be encased by an outer wrapping such as a plastic bag.

The foamed material employed consists essentially of a polymeric substrate in which a suitable gaseous material is admixed and contained. The polymeric substrate consists essentially of:

a) a polymer having a molecular weight between about 1,800 molecular weight units (Mw) and 25,000 molecular weight units (Mw), selected from the group consisting of polyethylene, ethylene vinyl acetate and mixtures thereof;

b) a hydrocarbon selected from the group consisting of polyterpenes, glycerol esters, five-carbon aliphatic hydrocarbons and mixtures thereof;

c) a stabilizer capable of preventing oxidation of the constituents of the polymer and surrounding materials. The polymeric substrate may also contain optional waxes, microcrystalline waxes, spoilage inhibitors and other components routinely employed in the meat-packaging or food packaging industry.

The polymeric substrate is prepared by the admixture of polymer, hydrocarbon, stabilizer and optional components with sufficient heating as is necessary to achieve liquification of substrate. The substrate is then admixed with a suitable gas to achieve foaming. In the preferred embodiment, liquid polymeric substrate is heated and maintained at a temperature between about 265° F. and about 375° F. and is then, combined with a stream of gas in a ratio of gas to substrate between about 1:1 and about 1:10 immediately prior to dispensing and application of the material.

Solidification of the foamed material begins to occur at temperatures below about 250° F.

This temperature is reached when the foamed material is dispensed from the suitable applicator. It has been found that the foamed material can be successfully applied to various meat products using applicators such as the type employed in systems described in U.S. Pat. Nos. 4,059,466 and 4,059,714 which are incorporated by reference herein. By employing such devices in meat packaging installations, point-of-contact temperatures between about 80° F. and 130° F. can be achieved. It is to be understood that the temperatures in such meat packaging installations are maintained at a level no greater than 40° F. It has been found, quite unexpectedly, that the foamed material remains of the present invention remains sufficiently formable at temperatures between about 80° F. and 130° F. for sufficient time to be applied to the meat product and to adhere readily thereto.

As generally practiced in this invention, the polymeric substrate contains between 40% and about 90% by weight polymer, between about 10% and about 60% by weight hydrocarbon; and between about 0.01% and about 0.5% by weight stabilizer. In the preferred embodiment, the polymeric substrate contains between about 75% and about 90% by weight polymer, between about 3 and about 25% by weight hydrocarbon and between about 0.1 and about 0.3% by weight stabilizer.

In the first embodiment of the present invention, the polymer is selected from the group consisting of polyethylene, copolymers of ethylene vinyl acetate, and mixtures thereof. The polymer employed has a molecular weight between about 1,800 molecular weight units and about 25,000 molecular weight units, with a molecular weight between about 17,000 and 19,000 being preferred. Suitable polyethylene materials are commercially available from Eastman Chemical Corporation under the trademark EPOLENE. Suitable ethylene vinyl acetate materials are commercially available from E.I. DuPont Corporation under the trademark ELVAX.

In a second embodiment, a polmer selected from the group consisting of polyethylene ethylene vinyl acetate and mixtures thereof is employed with the average molecular weight (Mw) of the polymer composition being between about 7,000 and about 11,000. In this embodiment, it is preferred that a mixture of a higher molecular weight polymer composition having a molecular weight between about 17,000 and 20,000 and lower molecular weight polymer composition having a molecular weight between about 7,000 and about 9,000 be admixed. The ratio of high molecular weight component to low molecular weight component is preferably a ratio between about 1:14 and about 1:17. The admixture thus prepared, preferably has a molecular weight between about 7,000 and 11,000. Suitable polyethylene materials are commercially available from Eastman Chemical Corporation under the trademark EPOLENE. Suitable copolymers of ethylene vinyl acetate are commercially available from E.I. DuPont Corporation under the trademark ELVAX.

The hydrocarbon employed is preferably an aliphatic hydrocarbon selected from the group consisting of polyterpenes, hydrogenated glycerol esters various five-carbon moleculars and mixtures thereof. Suitable polyterpenes are commercially available from Goodyear Corporation of Akron, Ohio under the trademark WINGTACK and Hercules Corporation of Wilmington, Del. under the trademark PICOTACK B-H-T.

Suitable hydrogenated glycerol esters are commercially available from Hercules Corporation of Wilmington, Del. under the trademark FORAL.

It has been found, quite unexpectedly, that foamed materials of the present invention exhibit improved adhesion characteristics when applied to products such as meat. Furthermore, the foamed material containing hydrogenated glycerol esters exhibits marked improvement in basic adhesion to the outer wrapper after conventional packing and at least one freeze-thaw cycle.

The stabilizer is preferably a material such as tetrakis [methylene (3,5-di-tert-butyl-4-hydroxy hydrocinnamate)] methane. A suitable stabilizer material is commercially available from Ciba-Geigy Corporation under the trademark IRGANOX.

Various other additives can also be included in the formulation. These can include waxes such as microcrystalline waxes, antioxidants, preservatives and the like. Such optional additives can comprise up to about 40% by weight of the polymeric substrate without adversely affecting the performance characteristics of the material.

The gaseous material employed can be any, which when combined with the polymeric substrate, cause foaming. In the preferred embodiment, the gas is a non-oxidative, biologically inert material. The gas may be selected from the group consisting of carbon dioxide, nitrogen, helium, hydrogen, argon and mixtures thereof, with preferred biologically inert materials selected from the group consisting of carbon dioxide, nitrogen and mixtures thereof. Where biological inertness is not required, it is also possible to employ other gasses such as oxygen, air or mixtures thereof.

In the preferred embodiment of the process of the present invention, the polymeric substrate composition is prepared by admixture and maintained in a liquid or semi-liquid state in an appropriate holding tank until it is admixed with gas and dispatched through a suitable applicator or to the product such as a cut of meat. Preferably the material is held at a tank temperature between about 265° F. and about 375° F. Prior to dispatch, the liquid or semi-liquid polymeric substrate is admixed with a suitable gas to entrain the gas therein. The gas and polymer mixture form a foamed material when, then, dispatched through a suitable applicator and applied to the product. The resulting foamed material has the admixed gas or contained therein.

In the process of the present invention, particularly where the foamed material is to be applied to meat it is preferred that the foamed material have a temperature below about 130° F. at the point at which the foam contacts the product. Preferably, the point-of-contact temperature is between about 80° F. and about 130° F. At temperatures within this range, the material can be applied directly to a cut of meat without the detrimental effects caused by localized heating. Despite the temperature drop, the dispatched foamed material retains sufficient fluidity or flexibility to permit application to the food product and adhesion thereto. The material sets up and adheres readily the product quickly after contact.

It is to be understood that application of the foamed material of the present invention to meat occurs in meat packing settings where the ambient temperature is maintained at or below about 40° F. These ambient temperatures greatly facilitate rapid heat transfer from the foamed material to the surrounding air.

It has been found that the foamed material thus applied solidifies and adheres essentially simultaneously upon contact to form a solid cushion which is releasably attached to the cut of meat. The bond between meat and the solidified foam is sufficiently strong to remain intact when jostled during subsequent wrapping and packaging. The solidified foam may be dislodged when desired by prying the foamed material off with minimal prying force with no appreciable damage to the meat.

After application of the foamed material, the product can be inserted into an outer wrapper package or bag. This wrapper package is made of a suitable commercially available plastic such as those routinely used in the meat-packing industry. The outer wrapper may be closed or sealed by any conventional means. In the finished product, the foamed material is interposed between sharp protrusions such as jagged bone ends and the wrapper. In this manner, the protrusions are cushioned, and any force created by a sharp or jagged end is either absorbed by, or deflected throughout the overlying foamed material, rather than being concentrated at the portion of the outer wrapper overlaying the protrusion.

Generally, when cuts of meat are packaged for storage and shipment, additional, packaging steps can be performed as desired to meat products having the applied foamed material with no detrimental effects to the meat products and no impediments to additional packing processes. Such steps generally involve the evacuation of the atmosphere in the outer package or wrapper by conventional vacuum packaging processes. Such processes are performed to increase shelf-life of the product and for ease of transport.

Where maximum shelf-life is sought, the foamed material of the present invention can be formulated using biologically inert gases such as nitrogen and the like to prevent oxygen, which may have been otherwise present in the foamed material, from leaking from the interstices present in the foam to cause discoloration or spoilage. Optional additives can also be incorporated in the foam to inhibit bacterial growth or trigger conversion of any trace amounts of residual oxygen present in the package to biologically inert materials.

It has been found that the foamed material of the present invention will adhere to outer wrapper materials with a bond strength greater than the bond strength between the foamed material and a cut of meat when the package is subjected to certain conventional meat packing procedures. Examples of such meat-packing proceedures include heat shrinking packaging and vacuum packaging or a combination of the two. The meat is packaged in a suitable heat-shrinkable outer wrapper and exposed to an external temperature of sufficient elevation for a sufficient duration to cause "shrinkage" of the wrap around the contours of the meat packaging. The excess atmosphere present in the wrapper is removed; causing the wrapper to tightly conform to the contours of the meat product and an foamed product positioned therebetween. Once subjected to these proceedures, the packaged meat product can be stored at freezing or subfreezing temperatures.

Without being bound to any theory, it is believed that proceedures such as heat-shrinking and exposure to sub-freezing temperatures while there is contact between the outer wrapper and the foamed material contributes to the increased bond strength between wrapper and foamed material. Examples of outer wrap materials suitable for this application are polymers selected from the group consisting of low density polyethylene, ethylene vinyl acetate, polypropylene, nylon, polyvinyl chloride and mixtures thereof.

The variation in bond strengths between foamed material and meat product and foamed material and outer wrap permits the foamed material to adhere more readily to the outer wrap. Due to this phenomenon, removal of the outer wrapper will generally cause the release of the foamed material from the product with the wrapper. This will eliminate the need for a separate removal step when the meat product is unwrapped.

While preferred forms and arrangements of parts have been discussed, it is to be understood that various changes in detail, and arrangement of parts as well as modification of the process to applications to other products to be packaged are to be considered within the scope and spirit of this disclosure.

To further illustrate the process and composition, the following Examples are given. It is to be understood that these Examples are provided for illustrative purposes, and are not to be construed as limiting the scope of the present invention.

EXAMPLE I

A polymeric substrate composition was prepared in the following manner. A portion of a synthetic polyterpene commercially available from Goodyear Corporation under the tradename WINGTACK 95 amounting to 70.0 g was, added to a stainless steel hot melt mixing vessel. An amount of IRGANOX 1010 stabilizer equalling 0.1 g was dispersed over the polyterpene. The material was heated to 350° F. after which 70.0 g of the polyethylene EPOLENE C-10 commercially available from Eastman Chemical Products was added. The polyethylene was permitted to liquify and was stirred for 20 minutes while the temperature wa maintained at 350° F.

The resulting material was a white fluid which was decanted into a suitable storage vessel. Physical measurements would indicate that the material has a density between about 7.4 and about 7.7 lbs/gal., a specific gravity between about 0.90 and about 0.92 and a softening point between 230° F. and 219° F.

EXAMPLE II

Additional quantities of the formulation of Example I are prepared and inserted into a Nordson FOAMELT device such as the one disclosed in U.S. Pat. No. 4,059,714 to Scholl et al. The formulation is heated to a temperature of 350° F. and mixed with nitrogen gas. The foamed material is dispensed onto a meat surface in a room with an ambient temperature of 39° F. Temperature readings of the foamed material are taken at the point of exit from the applicator and the point of contact with the meat. The temperature upon exit is 260° and the point of contact temperature is 125° F.

EXAMPLE III

Additional quantities of the formulation of Example I are prepared and selectively applied to protrusions on peices of meat using a Nordson FOAMELT 150 device similar to that disclosed in U.S. Pat. No. 4,059,714 to Scholl et al. The thickness of the foamed material is between about 3 mm and ½ inch. The meat is contained in a conventional refredgerated packaging room where the temperature is not allowed to rise above 40° F.

The foamed material adheres readily to the meat product and is not tacky to the touch immediately upon contact with the meat. This is taken to indicate solidification.

The meat thus treated is then, placed in an outer wrapper of conventional low density polyethylene, vacuum packaged and held at subfreezing temperatures for 72 hours. After this period, the meat product is thawed sufficiently to permit removal of the outer wrapping. The majority of foamed material is found to adhere to the wrapping and can be removed using manual plying force.

The meat is visually inspected after removal of the wrapper and any remaining areas of foamed material. No appreciable amounts of residual foamed material are found to adhere to the meat.

EXAMPLE IV

The meat packaged using the proceedures outlined in Example III is shipped using conventional shipping proceedures. Upon arrival at the destination, the packages are inspected for ruptures, leaks and the like. The, number of ruptures and leaks attributable to protrusions is significantly reduced compared to non-treated meat peices.

The packages are also inspected to determine whether the selectively applied foamed material shifted during shipment. No appreciable shifting is found.

EXAMPLE V

A ploymeric substrate containing 80% by weight EPOLENE C-10, 19.9% by WINGTACK 95 and 0.1 % by weight IRGANOX 1010 is prepared according to the process outlined in Example I and applied and tested according to the procedures outlined in Examples III and IV with similar results.

EXAMPLE VI

A polymeric substrate was prepared containing 15% by weight FORAL 85, 84.9% by weight of a mixture of EPOLENE C-10 and C-17 and 0.1% by weight IRGANOX 1010 according to the proceedures outlined in Example I. The ratio of EPOLENE C-17 to EPOLENE C-10 was 1:16. The resulting material was a white fluid which solidified upon cooling.

EXAMPLE VII

A polymeric substrate was prepared according to Example VI to which WINGTACK 95 was substituted for FORAL 85. The resulting material was permitted to cool and solidify.

EXAMPLE VIII

The polymeric substrates of Examples VI and VII are applied and tested according to the procedures outlined in Examples III and IV. Both perform satisfactorily. However, more foamed material containing FORAL 85 is removed from the outer wrapping than for the foamed materials containing WINGTACK 95. This indicates greater adhesion between the outer wrapper and the foamed material in material containing FORAL 85.

What is claimed is:

1. A process for packaging a food product having a bag puncturing surface of sufficient sharpness to puncture an outer wrapper when the bag is in overlying relationship thereto, the process comprising the steps of:

liquefying a polymeric composition consisting essentially of:

(a) a polymer selected from the group consisting of polyethylene, copolymers of ethylene vinyl acetate and mixtures thereof, present in an amount between about 40% and about 90% by weight of said polymeric composition, the polymer having a molecular weight between about 1,800 and about 25,000 molecular weight units;

(b) an organic compound selected from the group consisting of polyterpenes, hydrogenated glycerol esters and mixtures thereof, said organic compound present in an amount sufficient to impart flexible resiliency to said polymeric composition, upon solidifying of said polymeric composition; and (c) an antioxidant stabilizer present in an amount sufficient to prevent oxidation of said polymeric composition and surrounding food product;

admixing the liquefied polymeric composition with a gas, capable of producing foaming in said polymeric composition, to entrain said gas therein, said gas being present in a ratio of between about 1:1 and about 1:10, gas to composition, respectively;

selectively spraying said admixture of said polymeric composition and said gas directly onto the bag puncturing surface while simultaneously allowing said polymeric composition to foam, to selectively cover the bag puncturing surface, said admixture applied at a point-of-contact temperature of between about 80° F. and about 130° F.; allowing the applied foamed material to solidify and adhere to the product in the form of a flexible resilient coating on said surface; and, then, encasing the product in said outer wrapper to form a package such that the foamed flexible resilient coating is interposed between said bag puncturing surface and said wrapper in an amount sufficient to prevent puncture of said wrapper.

2. The process of claim 1 wherein the product has sharp protrusions and said polymeric material is selectively applied to said protrusions prior to encasing the product in the outer wrapping.

3. The process of claim 2 wherein said polymeric composition consists essentially of between about 75% and about 90% by weight polymer, between about 3% and about 25% by weight organic compound, and between about 0.1 and about 0.5% by weight stabilizer.

4. The process of claim 1 further comprising the step of adhering said polymeric foamed material to the outer wrapping with a bond strength greater than the strength of adhesion between said foamed material and the product such that said foamed material adheres to said outer wrapping when the outer wrapping is removed from the product.

5. The process of claim 1 further comprising the steps of:

treating said package formed by said outer wrapping to evacuate a substantial portion of the atmosphere existing therein; and closing and sealing said outer wrapping once evacuation is complete.

6. The process of claim 5 further comprising the step of substituting a biologically inert gas for said atmosphere remaining in said package formed by said outer wrapping after evacuation.

7. The process of claim 6 wherein the biologically inert gas is selected from the group consisting of carbon dioxide, nitrogen, and mixtures thereof.

8. The foamed material of claim 1 wherein the stabilizer is methane.

9. The method of claim 1 wherein said organic compound is present in an amount between about 3% and about 60% by weight of said polymeric composition.

10. The method of claim 1 wherein said stabilizer is present in an amount between about 0.05% and about 0.5% by weight of said polymeric composition.

* * * * *